(12) United States Patent
Tennent et al.

(10) Patent No.: US 6,432,866 B1
(45) Date of Patent: Aug. 13, 2002

(54) RIGID POROUS CARBON STRUCTURES, METHODS OF MAKING, METHODS OF USING AND PRODUCTS CONTAINING SAME

(75) Inventors: Howard Tennent, Kenneth Square; David Moy, Winchester; Chun-Ming Niu, Somerville, all of MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 09/500,740

(22) Filed: Feb. 9, 2000

Related U.S. Application Data (62) Division of application No. 08/857,383, filed on May 15, 1997, now Pat. No. 6,099,965.
(60) Provisional application No. 60/020,804, filed on May 15, 1996.

(51) Int. Cl.⁷ .................................................. B01J 21/18
(52) U.S. Cl. ........................ 502/180; 502/174; 502/181; 502/182; 502/183; 502/184; 502/185
(58) Field of Search ................................ 502/174, 180, 502/181, 182, 183, 184, 185

(56) References Cited

U.S. PATENT DOCUMENTS

| | | |
|---|---|---|
| 4,154,704 A | 5/1979 | Vinton et al. |
| 4,329,260 A | 5/1982 | Lester et al. |
| 4,518,575 A | 5/1985 | Porter et al. |
| 4,572,813 A | 2/1986 | Arakawa |
| 4,583,299 A | 4/1986 | Brooks |
| 4,642,125 A | 2/1987 | Burk et al. |
| 4,663,230 A | 5/1987 | Tennent |
| 4,816,289 A | 3/1989 | Komatsu et al. |
| 4,997,804 A | 3/1991 | Pekala |
| 5,081,163 A | 1/1992 | Pekala |
| 5,110,693 A | 5/1992 | Friend et al. |
| 5,165,909 A | 11/1992 | Tennent et al. |
| 5,238,568 A | 8/1993 | Fely et al. |
| 5,409,683 A | 4/1995 | Tillotson et al. |
| 5,439,864 A | 8/1995 | Rosin et al. |
| 5,454,784 A | 10/1995 | Baker et al. |
| 5,456,897 A | 10/1995 | Moy et al. |
| 5,494,940 A | 2/1996 | Unger et al. |
| 5,500,200 A | 3/1996 | Manderville et al. |
| 5,569,635 A | 10/1996 | Moy et al. |
| 5,626,650 A | 5/1997 | Rodriguez et al. |
| 5,691,054 A | 11/1997 | Tennent et al. |
| 5,707,916 A | 1/1998 | Snyder et al. |
| 5,800,706 A | 9/1998 | Fischer |
| 6,031,711 A * | 2/2000 | Tennent et al. ............. 361/303 |
| 6,099,960 A * | 8/2000 | Tennent et al. ............. 428/367 |

* cited by examiner

*Primary Examiner*—Elizabeth D. Wood
(74) *Attorney, Agent, or Firm*—Kramer Levin Naftalis & Frankel LLP; Barry Evans, Esq.

(57) ABSTRACT

This invention relates to rigid porous carbon structures and to methods of making same. The rigid porous structures have a high surface area which are substantially free of micropores. Methods for improving the rigidity of the carbon structures include causing the nanofibers to form bonds or become glued with other nanofibers at the fiber intersections. The bonding can be induced by chemical modification of the surface of the nanofibers to promote bonding, by adding "gluing" agents and/or by pyrolyzing the nanofibeirs to cause fusion or bonding at the interconnect points.

39 Claims, 4 Drawing Sheets

RIGID POROUS CARBON STRUCTURES, METHODS OF MAKING, METHODS OF USING AND PRODUCTS CONTAINING SAME

This application is a divisional application under 37 CFR Å1.53 of prior application Ser. No. 08/857,383, filed on May 15, 1997 now U.S. Pat. No. 6,049,965 by Tennent et al., and currently entitled RIGID POROUS CARBON STRUCTURES, METHODS OF MAKING, METHODS OF USING AND PRODUCTS CONTAINING SAME.

BACKGROUND OF THE INVENTION

1. Field of the Invention

The invention relates generally to rigid porous carbon structures. More specifically, the invention relates to rigid three dimensional structures comprising carbon nanofibers and having high surface area and porosity, low bulk density, low amount of micropores and increased crush strength and to methods of preparing and using such structures. The invention also relates to using such rigid porous structures for a variety of purposes including catalyst supports, electrodes, filters, insulators, adsorbents and chromatographic media and to composite structures comprising the rigid porous structures and a second material contained within the carbon structures.

2. Description of the Related Art

Heterogeneous catalytic reactions are widely used in chemical processes in the petroleum, petrochemical and chemical industries. Such reactions are commonly performed with the reactant(s) and product(s) in the fluid phase and the catalyst in the solid phase. In heterogeneous catalytic reactions, the reaction occurs at the interface between phases, i.e., the interface between the fluid phase of the reactant(s) and product(s) and the solid phase of the supported catalyst. Hence, the properties of the surface of a heterogeneous supported catalyst are significant factors in the effective use of that catalyst. Specifically, the surface area of the active catalyst, as supported, and the accessibility of that surface area to reactant chemisorption and product desorption are important. These factors affect the activity of the catalyst, i.e., the rate of conversion of reactants to products. The chemical purity of the catalyst and the catalyst support also have an important effect on the selectivity of the catalyst, i.e., the degree to which the catalyst produces one product from among several products, and the life of the catalyst.

Generally catalytic activity is proportional to catalyst surface area. Therefore, high specific area is desirable. However, that surface area must be accessible to reactants and products as well as to heat flow. The chemisorption of a reactant by a catalyst surface is preceded by the diffusion of that reactant through the internal structure of the catalyst and the catalyst support, if any. The catalytic reaction of the reactant to a product is followed by the diffusion of the product away from the catalyst and catalyst support. Heat must be able to flow into and out of the catalyst support as well.

Since the active catalyst compounds are often supported on the internal structure of a support, the accessibility of the internal structure of a support material to reactant(s), product (s) and heat flow is important. Porosity and pore size distribution of the support structure are measures of that accessibility. Activated carbons and charcoals used as catalyst supports have surface areas of about 1000 square meters per gram and porosities of less than one milliliter per gram. However, much of this surface area and porosity, as much as 50%, and often more, is associated with micropores, i.e., pores with pore diameters of 2 nanometers or less. These pores can be difficult to access because of diffusion limitations. Moreover, they are easily plugged and thereby deactivated. Thus, high porosity materials where the pores are mainly in the mesopore (>2 nanometers) or macropore (>50 nanometers) ranges are most desirable.

It is also important that supported catalysts not fracture or attrit during use because such fragments may become entrained in the reaction stream and must then be separated from the reaction mixture. The cost of replacing attritted catalyst, the cost of separating it from the reaction mixture and the risk of contaminating the product are all burdens upon the process. In other processes, e.g. where the solid supported catalyst is filtered from the process stream and recycled to the reaction zone, the fines may plug the filters and disrupt the process.

It is also important that a catalyst, at the very least, minimize its contribution to the chemical contamination of reactant(s) and product(s). In the case of a catalyst support, this is even more important since the support is a potential source of contamination both to the catalyst it supports and to the chemical process. Further, some catalysts are particularly sensitive to contamination that can either promote unwanted competing reactions, i.e., affect its selectivity, or render the catalyst ineffective, i.e., "poison" it. Charcoal and commercial graphites or carbons made from petroleum residues usually contain trace amounts of sulfur or nitrogen as well as metals common to biological systems and may be undesirable for that reason.

While activated charcoals and other carbon-containing materials have been used as catalyst supports, none have heretofore had all of the requisite qualities of porosity and pore size distribution, resistance to attrition and purity for use in a variety of organic chemical reactions. For example, as stated above, although these materials have high surface area, much of the surface area is in the form of inaccessible micropores (i.e., diameter<2 nm).

Nanofiber mats, assemblages and aggregates have been previously produced to take advantage of the high carbon purities and increased accessible surface area per gram achieved using extremely thin diameter fibers. These structures are typically composed of a plurality of intertwined or intermeshed fibers. Although the surface area of these nanofibers is less than an aerogel or activated large fiber, the nanofiber has a high accessible surface area since the nanofibers are substantially free of micropores.

One of the characteristics of the prior aggregates of nanofibers, assemblages or mats made from nanofibers is low mechanical integrity and high compressibility. Since the fibers are not very stiff these structures are also easily compressed or deformed. As a result the size of the structures cannot be easily controlled or maintained during use. In addition, the nanofibers within the assemblages or aggregates are not held together tightly. Accordingly, the assemblages and aggregates break apart or attrit fairly easily. These prior mats, aggregates or assemblages are either in the form of low porosity dense compressed masses of intertwined fibers and/or are limited to microscopic structures.

Moreover, the above described compressibility of the nanofiber structures may increase depending on a variety of factors including the method of manufacture. For example, as suspensions of the nanofibers are drained of a suspending fluid, in particular water, the surface tension of the liquid tends to pull the fibrils into a dense packed "mat". The pore size of the resulting mat is determined by the interfiber spaces which, because of the compression of these mats, tend to be quite small. As a result, the fluid flow characteristics of such mats are poor.

Alternatively, the structure may simply collapse under force or shear or simply break apart. The above described nanofiber structures are typically two fragile and/or too compressible to be used in such products as fixed beds or chromatographic media. The force of the fluid flow causes the flexible assemblages, mats or aggregates to compress, otherwise restricting. flow. The flow of a fluid through a capillary is described by Poiseuille's equation which relates the flow rate to the pressure differential, the fluid viscosity, the path length and size of the capillaries. The rate of flow per unit area varies with the square of the pore size. Accordingly, a pore twice as large results in flow rates four times as large. The presence of pores of a substantially larger size in a nanofiber structure results in increased fluid flow because the flow is substantially greater through the larger pores. Decreasing the pore size by compression dramatically reduces the flow. Moreover, such structures also come apart when subjected to shear resulting in the individual nanofibers breaking loose from the structure and be transported with the flow.

As set forth above, prior aggregates, mats or assemblages provide relatively low mechanical properties. Accordingly, although previous work has shown that nanofibers can be assembled into thin, membrane-like or particulate structures through which fluid will pass, such structures are flexible and compressible and are subject to attrition. Accordingly, when these structures are subjected to any force or shear, such as fluid or gas flow, these structures collapse and/or compress resulting in a dense, low porosity mass having reduced fluid flow characteristics. Moreover, although the individual nanofibers have high internal surface areas, much of the surface of the nanofiber structures is inaccessible due to the compression of the structure and resulting decrease in pore size.

It would be desirable to produce a rigid porous carbon structure having high accessible surface area, high porosity, increased rigidity and significantly free from or no micropores. This is particularly true since there are applications for porous carbon structures that require fluid passage and/or high mechanical integrity. The compressibility and/or lack of rigidity of previous structures of nanofibers creates serious limitations or drawbacks for such applications. The mechanical and structural characteristics of the rigid porous carbon structures brought about by this invention make such applications more feasible and/or more efficient.

OBJECTS OF THE INVENTION

It is therefore an object of this invention to provide rigid porous carbon structures having high accessible surface area.

It is another object of the invention to provide a composition of matter which comprises a three-dimensional rigid porous carbon structure comprising carbon nanofibers.

It is a still further object to provide a rigid porous carbon structure having non-carbon particulate matter or active sites dispersed within the structure on the surface of the nanofibers.

It is yet another object of the invention to provide a composition of matter comprising three-dimensional rigid porous carbon structure having a low bulk density and high porosity to which can be added one or more functional second materials in the nature of active catalysts, electroactive species, etc. so as to form composites having novel industrial properties.

It is a further object of the invention to provide processes for the preparation of and methods of using the rigid porous carbon structures.

It is a still further object of the invention to provide improved catalyst supports, filter media, chromatographic media, electrodes, EMI shielding and other compositions of industrial value based on three-dimensional rigid porous carbon structures.

It is a still further object of the invention to provide improved rigid catalyst supports and supported catalysts for fixed bed catalytic reactions for use in chemical processes in the petroleum, petrochemical and chemical industries.

It is a still further object of the invention to provide improved, substantially pure, rigid carbon catalyst support of high porosity, activity, selectivity, purity and resistance to attrition.

It is a still further object of the invention to provide a rigid aerogel composite comprising nanofibers.

It is a still further object of the invention to provide a rigid carbon nanofiber mat comprising carbon particles on the mat surface.

The foregoing and other objects and advantages of the invention will be set forth in or apparent from the following description and drawings.

SUMMARY OF THE INVENTION

The invention relates generally to rigid porous carbon structures and to methods of making same. More specifically, it relates to rigid porous structures having high surface area which are substantially free of micropores. More particularly, the invention relates to increasing the mechanical integrity and/or rigidity of porous structures comprising intertwined carbon nanofibers.

The present invention provides methods for improving the rigidity of the carbon structures by causing the nanofibers to form bonds or become glued with other nanofibers at the fiber intersections. The bonding can be induced by chemical modification of the surface of the nanofibers to promote bonding, by adding "gluing" agents and/or by pyrolyzing the nanofibers to cause fusion or bonding at the interconnect points.

The nanofibers within the porous structure can be in the form of discrete fibers or aggregate particles of nanofibers. The former results in a structure having fairly uniform properties. The latter results in a structure having two-tiered architecture comprising an overall macrostructure comprising aggregate particles of nanofibers bonded together to form the porous mass and a microstructure of intertwined nanofibers within the individual aggregate particles.

Another aspect of the invention relates to the ability to provide rigid porous particulates of a specified size dimension, for example, porous particulates of a size suitable for use in a fluidized packed bed. The method involves preparing a plurality of carbon nanofibers or aggregates, fusing the nanofibers at their intersections or aggregates to form a large bulk solid mass and sizing the solid mass down into pieces of rigid porous high surface area particulates having a size suitable for the desired use, for example, to a particle size suitable for forming a packed bed.

According to another aspect of the invention, the nanofibers are incorporated in an aerogel or xerogel composite through sol-gel polymerization.

According to another embodiment of the invention, the structures are used as filter media, as catalyst supports, filters, adsorbents, as electroactive materials for use, e.g. in electrodes in fuel cells and batteries, and as chromatography media. It has been found that the carbon structures are useful in the formation of composites which comprise the structure together with either a particulate solid, an electroactive component or a catalytically active metal or metal-containing compound.

DEFINITIONS

The term "assemblage", "mat" or "aggregate" refers to any configuration of a mass of intertwined individual nanofibers. The term "assemblage" includes open loose structures having uniform properties. The term "mat" refers to a relatively dense felt-like structure. The term "aggregate" refers to a dense, microscopic particulate structure. More specifically, the term "assemblage" refers to structures having relatively or substantially uniform physical properties along at least one dimensional axis and desirably have relatively or substantially uniform physical properties in one or more planes within the assemblage, i.e. they have isotropic physical properties in that plane. The assemblage may comprise uniformly dispersed individual interconnected nanofibers or a mass of connected aggregates of nanofibers. In other embodiments, the entire assemblage is relatively or substantially isotropic with respect to one or more of its physical properties. The physical properties which can be easily measured and by which uniformity or isotropy are determined include resistivity and optical density.

The term "accessible surface area" refers to that surface area not attributed to micropores (i.e., pores having diameters or cross-sections less than 2 nm).

The term "fluid flow rate characteristic" refers to the ability of a fluid or gas to pass through a solid structure. For example, the rate at which a volume of a fluid or gas passes through a three-dimensional structure having a specific cross-sectional area and specific thickness or height differential across the structure (i.e. milliliters per minute per square centimeter per mil thickness).

The term "isotropic" means that all measurements of a physical property within a plane or volume of the structure, independent of the direction of the measurement, are of a constant value. It is understood that measurements of such non-solid compositions must be taken on a representative sample of the structure so that the average value of the void spaces is taken into account.

The term "nanofiber" refers to elongated structures having a cross section (e.g., angular fibers having edges) or diameter (e.g., rounded) less than 1 micron. The structure may be either hollow or solid. Accordingly, the term includes "bucky tubes" and "nanotubes". This term is defined further below.

The term "internal structure" refers to the internal structure of an assemblage including the relative orientation of the fibers, the diversity of and overall average of fiber orientations, the proximity of the fibers to one another, the void space or pores created by the interstices and spaces between the fibers and size, shape, number and orientation of the flow channels or paths formed by the connection of the void spaces and/or pores. According to another embodiment, the structure may also include characteristics relating to the size, spacing and orientation of aggregate particles that form the assemblage. The term "relative orientation" refers to the orientation of an individual fiber or aggregate with respect to the others (i.e., aligned versus non-aligned). The "diversity of" and "overall average" of fiber or aggregate orientations refers to the range of fiber orientations within the structure (alignment and orientation with respect to the external surface of the structure).

The term "physical property" means an inherent, measurable property of the porous structure, e.g., surface area, resistivity, fluid flow characteristics, density, porosity, etc.

The term "relatively" means that ninety-five percent of the values of the physical property when measured along an axis of, or within a plane of or within.a volume of the structure, as the case may be, will be within plus or minus 20 percent of a mean value.

The term "substantially" means that ninety-five percent of the values of the physical property when measured along an axis of, or within a plane of or within a volume of the structure, as the case may be, will be within plus or minus ten percent of a mean value.

The terms "substantially isotropic" or "relatively isotropic" correspond to the ranges of variability in the values of a physical property set forth above.

DETAILED DESCRIPTION OF THE INVENTION

Nanofibers

The term nanofibers refers to various fibers, particularly carbon fibers, having very small diameters including fibrils, whiskers, nanotubes, buckytubes, etc. Such structures provide significant surface area when incorporated into a structure because of their size and shape. Moreover, such fibers can be made with high purity and uniformity.

Preferably, the nanofiber used in the present invention has a diameter less than 1 micron, preferably less than about 0.5 micron, and even more preferably less than 0.1 micron and most preferably less than 0.05 micron.

According to one preferred embodiment of the invention, carbon fibrils are used to form the rigid assemblage. Carbon fibrils can be made having diameters in the range of 3.5 to 70 nanometers.

The fibrils, buckytubes, nanotubes and whiskers that are referred to in this application are distinguishable from continuous carbon fibers commercially available as reinforcement materials. In contrast to nanofibers, which have desirably large, but unavoidably finite aspect ratios, continuous carbon fibers have aspect ratios (L/D) of at least $10^4$ and often $10^6$ or more. The diameter of continuous fibers is also far larger than that of fibrils, being always >1.0 $\mu$m and typically 5 to 7 $\mu$m.

Continuous carbon fibers are made by the pyrolysis of organic precursor fibers, usually rayon, polyacrylonitrile (PAN) and pitch. Thus, they may include heteroatoms within their structure. The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanofiber chemistry.

Carbon fibrils are vermicular carbon deposits having diameters less than $1.0\mu$, preferably less than $0.5\mu$, even more preferably less than $0.2\mu$ and most preferably less than $0.05\mu$. They exist in a variety of forms and have been prepared through the catalytic decomposition of various carbon-containing gases at metal surfaces. Such vermicular carbon deposits have been observed almost since the advent of electron microscopy. A good early survey and reference is found in Baker and Harris, *Chemistry and Physics of Carbon*, Walker and Thrower ed., Vol. 14, 1978, p. 83 and Rodriguez, N., *J. Mater. Research*, Vol. 8, p. 3233 (1993), each of which are hereby incorporated by reference. (see also, Obelin, A. and Endo, M., *J. of Crystal Growth*, Vol. 32 (1976), pp. 335–349, hereby incorporated by reference).

U.S. Pat. No. 4,663,230 to Tennent, hereby incorporated by reference, describes carbon fibrils that are free of a continuous thermal carbon overcoat and have multiple ordered graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than $0.1\mu$ and length to diameter ratios of at least 5. Desirably they are substantially free of a continuous thermal carbon overcoat, i.e., pyrolytically deposited carbon resulting from thermal cracking of the gas feed used to prepare them. The Tennent invention provided access to smaller diameter fibrils, typically 35 to 700 Å (0.0035 to $0.070\mu$) and to an ordered, "as grown" graphitic surface. Fibrillar carbons of less perfect structure, but also without a pyrolytic carbon outer layer have also been grown.

U.S. Pat. No. 5,171,560 to Tennent et al., hereby incorporated by reference, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than $0.1\mu$ and a length to diameter ratio of greater than 5. These fibrils are of primary interest in the invention.

When the projection of the graphitic layers on the fibril axis extends for a distance of less than two fibril diameters, the carbon planes of the graphitic nanofiber, in cross section, take on a herring bone appearance. These are termed fishbone fibrils. Geus, U.S. Pat. No. 4,855,091, hereby incorporated by reference, provides a procedure for preparation of fishbone fibrils substantially free of a pyrolytic overcoat. These fibrils are also useful in the practice of the invention.

According to one embodiment of the invention, oxidized nanofibers are used to form the rigid porous assemblage. McCarthy et al., U.S. patent application Ser. No. 351,967 filed. May 15, 1989, hereby incorporated by reference, describes processes for oxidizing the surface of carbon fibrils that include contacting the fibrils with an oxidizing agent that includes sulfuric acid ($H_2SO_4$) and potassium chlorate ($KClO_3$) under reaction conditions (e.g., time, temperature, and pressure) sufficient to oxidize the surface of the fibril. The fibrils oxidized according to the processes of McCarthy, et al. are non-uniformly oxidized, that is, the carbon atoms are substituted with a mixture of carboxyl, aldehyde, ketone, phenolic and other carbonyl groups.

Fibrils have also been oxidized non-uniformly by treatment with nitric acid. International Application PCT/US94/10168 discloses the formation of oxidized fibrils containing a mixture of functional groups. Hoogenraad, M. S., et al. ("Metal Catalysts supported on a Novel Carbon Support", Presented at Sixth International Conference on Scientific Basis for the Preparation of Heterogeneous Catalysts, Brussels, Belgium, September 1994) also found it beneficial in the preparation of fibril-supported precious metals to first oxidize the fibril surface with nitric acid. Such pretreatment with acid is a standard step in the preparation of carbon-supported noble metal catalysts, where, given the usual sources of such carbon, it serves as much to clean the surface of undesirable materials as to functionalize it.

In published work, McCarthy and Bening (Polymer Preprints ACS Div. of Polymer Chem. 30 (1)420(1990)) prepared derivatives of oxidized fibrils in order to demonstrate that the surface comprised a variety of oxidized groups. The compounds they prepared, phenylhydrazones, haloaromaticesters, thallous salts, etc., were selected because of their analytical utility, being, for example, brightly colored, or exhibiting some other strong and easily identified and differentiated signal. These compounds were not isolated and are, unlike the derivatives described herein, of no practical significance.

The nanofibers may be oxidized using hydrogen peroxide, chlorate, nitric acid and other suitable reagents.

The nanofibers within the structure may be further functionalized as set forth in U.S. patent application Ser. No. 08/352,400, filed Dec. 8, 1995, by Hoch and Moy et al., entitled "Functionalized Fibrils", hereby incorporated by reference.

Carbon nanotubes of a morphology similar to the catalytically grown fibrils described above have been grown in a high temperature carbon arc (Iijima, Nature 354 56 1991, hereby incorporated by reference). It is now generally accepted (Weaver, Science 265 1994, hereby incorporated by reference) that these arc-grown nanofibers have the same morphology as the earlier catalytically grown fibrils of Tennent. Arc grown carbon nanofibers are also useful in the invention.

The nanofibers may also be high surface area nanofibers disclosed in U.S. Provisional Application Ser. No. 60/017, 787 (CMS Docket No.: 370077-3630) entitled "High Surface Area Nanofibers, Methods of Making, Methods of Using and Products Containing Same", filed concurrently, hereby incorporated by reference.

Nanofiber Aggregates and Assemblages

The "unbonded" precursor nanofibers may be in the form of discrete fibers, aggregates of fibers or both.

When carbon fibrils are used, the aggregates, when present, are generally of the bird's nest, combed yarn or open net morphologies. The more "entangled" the aggregates are, the more processing will be required to achieve a suitable composition if a high porosity is desired. This means that the selection of combed yarn or open net aggregates is most preferable for the majority of applications. However, bird's nest aggregates will generally suffice.

The nanofiber mats or assemblages have been prepared by dispersing nanofibers in aqueous or organic mediums and then filtering the nanofibers to form a mat or assemblage. Assemblages have also been prepared by intimately mixing nanofibers with carbonizable resins, such as phenolic resins, in a kneader, followed by extruding or pelletizing and pyrolizing. The mats have also been prepared by forming a gel or paste of nanofibers in a fluid, e.g. an organic solvent such as propane and then heating the gel or paste to a temperature above the critical temperature of the medium, removing supercritical fluid and finally removing the resultant porous mat or plug from the vessel in which the process has been carried out. See, parent U.S. patent application Ser. No. 08/428,496 entitled "Three-Dimensional Macroscopic Assemblages of Randomly Oriented Carbon Fibrils and Composites Containing Same" by Tennent et al., hereby incorporated by reference.

Nanofibers may also be prepared as aggregates having various morphologies (as determined by scanning electron microscopy) in which they are randomly entangled with each other to form entangled balls of nanofibers resembling bird nests ("BN"); or as aggregates consisting of bundles of straight to slightly bent or kinked carbon nanofibers having substantially the same relative orientation, and having the appearance of combed yarn ("CY") e.g., the longitudinal axis of each nanofiber (despite individual bends or kinks) extends in the same direction as that of the surrounding nanofibers in the bundles; or, as, aggregates consisting of straight to slightly bent or kinked nanofibers which are loosely entangled with each other to form an "open net" ("ON") structure. In open net structures the of nanofiber entanglement is greater than observed in the combed yarn aggregates (in which the individual nanofibers have substantially the same relative orientation) but less than that of bird nest. CY and ON aggregates are more readily dispersed than BN making them useful in composite fabrication where uniform properties throughout the structure are desired. The substantial linearity of the individual nanofiber strands also makes the aggregates useful in EMI shielding and electrical applications.

The morphology of the aggregate is controlled by the choice of catalyst support. Spherical supports grow nanofibers in all directions leading to the formation of bird nest aggregates. Combed yarn and open nest aggregates are prepared using supports having one or more readily cleavable planar surfaces, e.g., an iron or iron-containing metal catalyst particle deposited on a support material having one or more readily cleavable surfaces and a surface area of at least 1 square meters per gram. Moy et al., U.S. application Ser. No. 08/469,430 entitled "Improved Methods and Catalysts for the Manufacture of Carbon Fibrils", filed Jun. 6, 1995, hereby incorporated by reference, describes fibrils prepared as aggregates having various morphologies (as determined by scanning electron microscopy).

Further details regarding the formation of carbon nanofiber aggregates may be found in the disclosure of U.S. Pat. No. 5,165,909 to Tennent; U.S. Pat. No. 5,456,897 to Moy et al.; Snyder et al., U.S. patent application Ser. No. 149,573, filed Jan. 28, 1988, and PCT Application No. US89/00322, filed Jan. 28, 1989 ("Carbon Fibrils") WO 89/07163, and Moy et al., U.S. patent application Ser. No. 413,837 filed Sep. 28, 1989 and PCT Application No. US90/05498, filed Sep. 27, 1990 ("Fibril Aggregates and Method of Making Same") WO 91/05089, and U.S. application Ser. No. 08/479, 864 to Mandeville et al., filed Jun. 7, 1995 and U.S. application Ser. No. 08/329,774 by Bening et al., filed Oct. 27, 1984 and U.S. application Ser. No. 08/284,917, filed Aug. 2, 1994 and U.S. application Ser. No. 07/320,564. , filed Oct. 11, 1994 by Moy et al., all of which are assigned to the same assignee as the invention here and are hereby incorporated by reference.

Hard, Porous Carbon Structures and Methods of Preparing Same

The invention relates to methods for producing rigid, porous structures from nanofibers. The resulting structures may be used in catalysis, chromatography, filtration systems, electrodes and batteries, etc.

1. Rigid Porous Carbon Nanofiber Structures

The rigid porous carbon structures according to the invention have high accessible surface area. That is, the structures have a high surface area, but are substantially free of micropores (i.e., pores having a diameter or cross-section less than 2 nm). The invention relates to increasing the mechanical integrity and/or rigidity of porous structures comprising intertwined carbon nanofibers. The structures made according to the invention have higher crush strengths than the conventional nanofiber structures. The present invention provides a method of improving the rigidity of the carbon structures by causing the nanofibers to form bonds or become glued with other nanofibers at the fiber intersections. The bonding can be induced by chemical modification of the surface of the nanofibers to promote bonding, by adding "gluing" agents and/or by pyrolyzing the nanofibers to cause fusion or bonding at the interconnect points.

The nanofibers can be in the form of discrete fibers or aggregate particles of nanofibers. The former results in a structure having fairly uniform properties. The latter results in a structure having two-tiered architecture comprising an overall macrostructure comprising aggregate particles of nanofibers bonded together and a microstructure of intertwined nanofibers within the individual aggregate particles.

Figure 1:
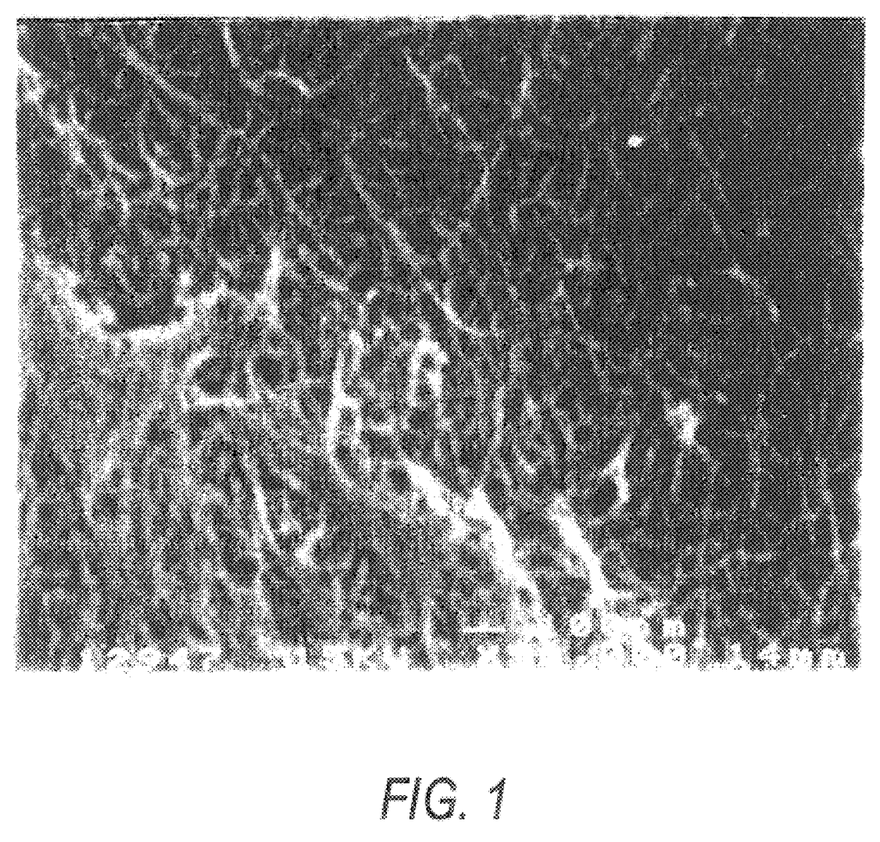
FIG. 1 is a SEM photomicrograph of a rigid porous carbon structure made from oxidized fibrils followed by pyrolysis.

According to one embodiment, individual discrete nanofibers form the structure. In these cases, the distribution of individual fibril strands in the particles are substantially uniform with substantially regular spacing between strands. These spacings (analogous to pores in conventional supports) varied according to the densities of the structures and ranged roughly from 15 nm in the densest (pressed disc from oxidized fibrils, density=1–1.2 g/cc) to an average 50–60 nm in the lightest particles (e.g., solid mass formed from open net aggregates). Absent are cavities or spaces that would correspond to micropores (<2 nm) in conventional carbon supports. FIG. 1 is a SEM photograph of a nanofiber structure formed using individual oxidized nanofibers.

These rigid porous materials are superior to currently available high surface area materials for use in fixed-bed carbon-supported catalysts, for example. The ruggedness of the structures, the porosity (both pore volume and pore structure), and the purity of the carbon are significantly improved. Combining these properties with relatively high surface areas provides a unique material with useful characteristics. Additionally, no other carbon support (perhaps no other of any kind) has surface areas as high as 400 $m^2/g$ without having much of the area buried in inaccessible micropores.

One embodiment of the invention relates to a rigid porous carbon structure having an accessible surface area greater than about 100 $m^2/gm$, being substantially free of micropores and having a crush strength greater than about 1 lb. Preferably, the structure comprises intertwined, interconnected carbon nanofibers wherein less than 1% of said surface area is attributed to micropores.

Preferably, the structures have a carbon purity greater than 50 wt %, more preferably greater than 80 wt %, even more preferably greater than 95 wt % and most preferably greater than 99 wt %.

Preferably, the structures made from oxidized nanofibers (measured in the form of ⅛ inch diameter cylindrical extrudates) have a crush strength greater than 5 lb/in$^2$, more preferably greater than 10 lb/in$^2$, even more preferably greater than 15 lb/in$^2$ and most preferably greater than 20 lb/in$^2$.

Preferably, the structures made from "as is" nanofibers (measured in the form of ¼ diameter pellets) have a crush strength greater than 20 lb/in$^2$, more preferably greater than about 40 lb/in$^2$, even more preferably greater than about 60 lb/in$^2$ and most preferably greater than about 70 lb/in$^2$.

According to another embodiment, the rigid porous carbon structure having an accessible surface area greater than about 100 m$^2$/gm, having a crush strength greater than about 5 lb/in$^2$, and a density greater than 0.8 g/cm$^3$. Preferably, the structure is substantially free of. micropores.

According to yet another embodiment, the rigid porous carbon structure has an accessible. surface area greater than about 100 m$^2$/gm, porosity greater than 0.5 cc/g, being substantially free of micropores, having a carbon purity greater than 95 wt % and having a crush strength greater than about 5 lb/in$^2$.

The structure preferably has a density greater than 0.8 g/cm$^3$. According to another embodiment, the structure preferably has a density greater than 1.0 g/dm$^3$.

Preferably, the structure has an accessible surface area greater than about 100 m$^2$/g, more preferably greater than 150 m$^2$/g, even more preferably greater than 200 m$^2$/g, even more preferably greater than 300 m$^2$/g, and most preferably greater than 400 m$^2$/g.

According to one embodiment, the structure comprises nanofibers which are uniformly and evenly distributed throughout said structure. That is, the structure is a rigid and uniform assemblage of nanofibers. The structure comprises substantially uniform pathways and spacings between said nanofibers. The pathways or spacings are uniform in that each has substantially the same cross-section and are substantially evenly spaced. Preferably, the average distance between nanofibers is less than about 0.03 microns and greater than about 0.005 microns. The average distance may vary depending on the density of the structure.

According to another embodiment, the structure comprises nanofibers in the form of nanofiber aggregate particles interconnected to form said structure. These structures comprise larger aggregate spacings between the interconnected aggregate particles and smaller nanofiber spacings between the individual nanofibers within the aggregate particles. Preferably, the average largest distance between said individual aggregates is less than about 0.1 microns and greater than about 0.001 microns. The aggregate particles may include, for example, particles of randomly entangled balls of nanofibers resembling bird nests and/or bundles of nanofibers whose central axes are generally aligned parallel to each other.

The nanofibers have an average diameter less than about 1 micron. Preferably, less than 0.5 microns, more preferably less than 0.1 micron, even more preferably less than 0.05 microns, and most preferably less than 0.01 microns.

Preferably, the nanofibers are carbon fibrils being substantially cylindrical with a substantially constant diameter, having graphitic or graphenic-layers concentric with the fibril axis and being substantially free of pyrolytically deposited carbon.

Another aspect of the invention relates to the ability to provide rigid porous particulates or pellets of a specified size dimension. For example, porous particulates or pellets of a size suitable for use in a fluidized packed bed. The method involves preparing a plurality of carbon nanofibers or aggregates, fusing or gluing the aggregates or nanofibers at their intersections to form a large rigid bulk solid mass and sizing the solid mass down into. pieces of rigid porous high surface area particulates having a size suitable for the desired use, for example, to a particle size suitable for forming a packed bed.

The above-described structures are formed by causing the nanofibers to form bonds or become glued with other nanofibers at the fiber intersections. The bonding can be induced by chemical modification of the surface of the nanofibers to promote bonding, by adding "gluing" agents and/or by pyrolyzing the nanofibers to cause fusion or bonding at the interconnect points.

The hard, high porosity structures can be formed from regular nanofibers or nanofiber aggregates, either with or without surface modified nanofibers (i.e., surface oxidized nanofibers). In order to increase the stability of the nanofiber structures, it is also possible to deposit polymer at the intersections of the structure. This may be achieved by infiltrating the assemblage with a dilute solution of low molecular weight polymer cement (i.e., less than about 1,000 MW) and allowing the solvent to evaporate. Capillary forces will concentrate the polymer at nanofiber intersections. It is understood that in order to substantially improve the stiffness and integrity of the structure, only a small fraction of the nanofiber intersections need be cemented.

One embodiment of the invention relates to a method of preparing a rigid porous carbon structure having a surface area greater than at least 100 m$^2$/gm, comprising the steps of:

(a) dispersing a plurality of nanofibers in a medium to form a suspension; and (b) separating said medium from said suspension to form said structure, wherein said nanofibers are interconnected to form said rigid structure of intertwined nanotubes bonded at nanofiber intersections within the structure.

The nanofibers may be uniformly and evenly distributed throughout the structure or in the form of aggregate particles interconnected to form the structure. When the former is desired, the nanofibers are dispersed thoroughly in the medium to form a dispersion of individual nanofibers. When the latter is desired, nanofiber aggregates are dispersed in the medium to form a slurry and said aggregate particles are connected together with a gluing agent to form said structure.

The medium used may be selected from the group consisting of water and organic solvents. Preferably, the medium comprises a dispersant selected from the group consisting of alcohols, glycerin, surfactants, polyethylene glycol, polyethylene imines and polypropylene glycol.

The medium should be selected which: (1) allows for fine dispersion of the gluing agent in the aggregates; and (2) also acts as a templating agent to keep the internal structure of the aggregates from collapsing as the mix dries down.

One preferred embodiment employs a combination of polyethylene glycol (PEG) and glycerol dissolved in water or alcohol as the dispersing medium, and a carbonizable material such as low MW phenol-formaldehyde resins or other carbonizable polymers or carbohydrates (starch or sugar).

If surface oxidized nanofibers are employed, the nanofibers are oxidized prior to dispersing in the medium and are self-adhering forming the rigid structure by binding at the nanofiber intersections. The structure may be subsequently pyrolized to remove oxygen.

According to another embodiment, the nanofibers are dispersed in said suspension with gluing agents and the gluing agents bond said nanofibers to form said rigid structure. Preferably, the gluing agent comprises carbon, even more preferably the gluing agent is selected from a material that, when pyrolized, leaves only carbon. Accordingly, the structure formed with such a gluing may be subsequently pyrolized to convert the gluing agent to carbon.

Preferably, the gluing agents are selected from the group consisting of cellulose, carbohydrates, polyethylene, polystyrene, nylon, polyurethane, polyester, polyamides and phenolic resins.

According to further embodiments of the invention, the step of separating comprises filtering the suspension or evaporating the medium from said suspension.

According to yet another embodiment, the suspension is a gel or paste comprising the nanofibers in a fluid and the separating comprises the steps of:

(a) heating the gel or paste in a pressure vessel to a temperature above the critical temperature of the fluid;

(b) removing supercritical fluid from the pressure vessel; and (c) removing the structure from the pressure vessel.

Isotropic slurry dispersions of nanofiber aggregates in solvent/dispersant mixtures containing gluing agent can be accomplished using a Waring blender or a kneader without disrupting the aggregates. The nanofiber aggregates trap the resin particles and keep them distributed.

These mixtures can be used as is, or can be filtered to remove sufficient solvent to obtain cakes with high nanofiber contents (~5–20% dry weight basis). The cake can be molded, extruded or pelletized. The molded shapes are sufficiently stable so that further drying occurs without collapse of the form. On removing solvent, disperant. molecules, along with particles of gluing agent are concentrated and will collect at nanofiber crossing points both within the nanofiber aggregates, and at the outer edges of the aggregates. As the mixture is further dried down and eventually carbonized, nanofiber strands within the aggregates and the aggregates themselves are glued together at contact points. Since the aggregate structures do not collapse, a relatively hard, very porous, low density particle is formed.

As set forth above, the rigid, porous structures may also be formed using oxidized nanofibers with or without a gluing agent. Carbon nanofibers become self-adhering after oxidation. Very hard, dense mats are formed by highly dispersing the oxidized nanofibers (as individualized strands), filtering and drying. The dried mats have densities between 1–1.2 g/cc, depending on oxygen content, and are hard enough to be ground and sized by sieving. Measured surface areas are about 275 $m^2/g$.

Substantially all the oxygen within the resulting rigid. structure can be removed by pyrolizing the particles at about 600° C. in flowing gas, for example argon. Densities decrease to about 0.7–0.9 g/cc and the surface areas increase to about 400 $m^2/g$. Pore volumes for the calcined particles are about 0.9–0.6 cc/g, measured by water. absorbtion.

The oxidized nanofibers may also be used in conjunction with a gluing agent. Oxidized nanofibers are good starting materials since they have attachment points to stick both gluing agents and templating agents. The latter serve to retain the internal structure of the particles or mats as they dry, thus preserving the high porosity and low density of the original nanofiber aggregates. Good dispersions are obtained by slurrying oxidized nanofibers with materials such as polyethyleneimine cellulose (PEI Cell), where the basic imine functions form strong electrostatic interactions with carboxylic acid functionalized fibrils. The mix is filtered to form mats. Pyrolizing the mats at temperatures greater than 650° C. in an inert atmosphere converts the PEI Cell to carbon which acts to fuse the nanofiber aggregates together into hard structures. The result is a rigid, substantially pure carbon structure.

Solid ingredients can also be incorporated within the structure by mixing the additives with the nanofiber dispersion prior to formation of the structure. The content of other solids: in the dry structure may be made as high as fifty parts solids per part of nanofibers.

According to one preferred embodiment, nanofibers are dispersed at high shear in a high-shear mixer, e.g. a Waring Blender. The dispersion may contain broadly from 0.01 to 10% nanofibers in water, ethanol, mineral spirits, etc. This procedure adequately opens nanofiber bundles, i.e. tightly wound bundles of nanofibers, and disperses the nanofibers to form self-supporting mats after filtration and drying. The application of high shear mixing may take up to several hours. Mats prepared by this method, however, are not free of aggregates.

If the high shear procedure is followed by ultrasonication, dispersion is improved. Dilution to 0.1% or less aids ultrasonication. Thus, 200 cc of 0.1% fibrils, for example, may be sonified by a Bronson Sonifier Probe (450 watt power supply) for 5 minutes or more to further improve the dispersion.

To achieve the highest degrees of dispersion, i.e. a dispersion which is free or virtually free of fibril aggregates, sonication must take place either at very low concentration in a compatible liquid, e.g. at 0.001% to 0.01% concentration in ethanol or at higher concentration e.g. 0.1% in water to which a surfactant, e.g. Triton X-100, has been added in a concentration of about 0.5%. The mat which is subsequently formed may be rinsed free or substantially free of surfactant by sequential additions of water followed by vacuum filtration.

Particulate solids such as $MnO_2$ (for batteries) and $Al_2O_3$ (for high temperature gaskets) may be added to the nanofiber dispersion prior to mat formation at up to 50 parts added solids per part of fibrils.

Reinforcing webs and scrims may be incorporated on or in the mats during formation. Examples are polypropylene mesh and expanded nickel screen.

Lightly oxidized (i.e., with 30% $H_2O_2$) nanofiber aggregates still disperse as aggregates, rather than as individualized nanofibers. Bonding these structures together retains the high porosities and low densities of the original nanofibers.

According to one embodiment, discs (½ inch in diam) were prepared by isostatic pressing the dried powders of oxidized nanofibers. Densities of the discs, which are related to oxygen content, could be varied by thermal treatment of the discs. Hard particles with high densities and intermediate porosities can be formed by these methods. Rigid, porous structures made from BN and CC production nanofiber aggregates with and without any prior chemical treatment have been made,.using phenolic resins or other organic polymers as gluing agents, and their properties are summarized in the Table I.

TABLE I

Summary of Physical Properties of Formed Structures.

| Fibril or Aggregate Type | Density g/cc | Water Absorp. cc/g |
|---|---|---|
| Oxid. Mats, uncalc. | 1–1.2 | 0.6–0.3 |
| Oxidized Mats, calc. | 0.7–.9 | 0.6–0.9 |
| BN (Green Disc) | 1.74 | — |
| BN (600° C. Disc) | 1.59 | — |
| BN (900° C. Disc) | 1.56 | — |
| CC (Green Disc) | 1.33 | — |
| CC (600° C. Disc) | 1.02 | 0.6 |
| CC (900° C. Disc) | 0.95 | 0.6 |
| PU-BN (20%) | 0.7 | 0.9 |
| PS-CC (15%) | 0.6 | 1.1 |
| PE-BN (20%) | 0.4 | 3.5 |
| CC (2) | 0.15 | 6.0 |
| BN (2) | 0.30 | 2.8 |
| CC (2) | 0.14 | 6.5 |
| BN (2) | 0.31 | 2.6 |
| CC (2) | 0.27 | 3.2 |
| BN (2) | 0.50 | 1.5 |
| CC (2) | 0.23 | 3.8 |
| CC (2) | 0.32 | 2.6 |
| CC (3) | 0.33 | 2.5 |
| CC (3) | 0.47 | 1.7 |

(1) Oxidized Fibrils
(2) As-grown Fibrils/Dispersant/Gluing Agent
(3) As-grown Fibrils/PEG/Bakelite Resin-Extrudates The structures may also be useful in capacitors as set forth in U.S. Provisional Application Serial No. 60/017,609 (CMS Docket No.: 370077-3600) entitled, "GRAPHITIC NANOFIBERS IN ELECTROCHEMICAL CAPACITORS", filed concurrently, hereby incorporated by reference.

Another aspect of the invention relates to the formation of aerogel or xerogel composites comprising nanofibers to form a rigid porous structure. Aerogels are a unique class of materials with extremely low density, high porosity and surface areas. Organic aerogels and carbon aerogels, as exemplified by R. W. Pekala's publications, are attractive for many applications including high density energy storage, high capacity absorbents and catalysts supports. Similar materials, so called foamed organic polymer with relatively low density are well known and are widely used as insulating materials. Conventional monolithic organic aerogels have very poor mechanical properties. In most cases, the aerogels are insulators. Therefore, it is of interest to prepare aerogel composites with improved mechanical and electronic properties. An xerogel is similar to an aerogel, but has a denser structure as a result of the method of manufacture (see FIG. 4).

Such structures are set forth more fully in U.S. Pat. Nos. 5,476,878 to Pekala; U.S. Pat. No. 5,124,100 to Nishii et al.; U.S. Pat. No. 5,494,940 to Unger et al.; U.S. Pat. No. 5,416,376 to Wuest et al; U.S. Pat. No. 5,409,683 to Tillotson et al.; U.S. Pat. No. 5,395,805 to Droege et al.; U.S. Pat. No. 5,081,163 to Pekala; U.S. Pat. No. 5,275,796 to Tillotson; U.S. Pat. No. 5,086,085 to Pekala; and U.S. Pat. No. 4,997,804 to Pekala, each of which are hereby incorporated by reference.

Figure 4:
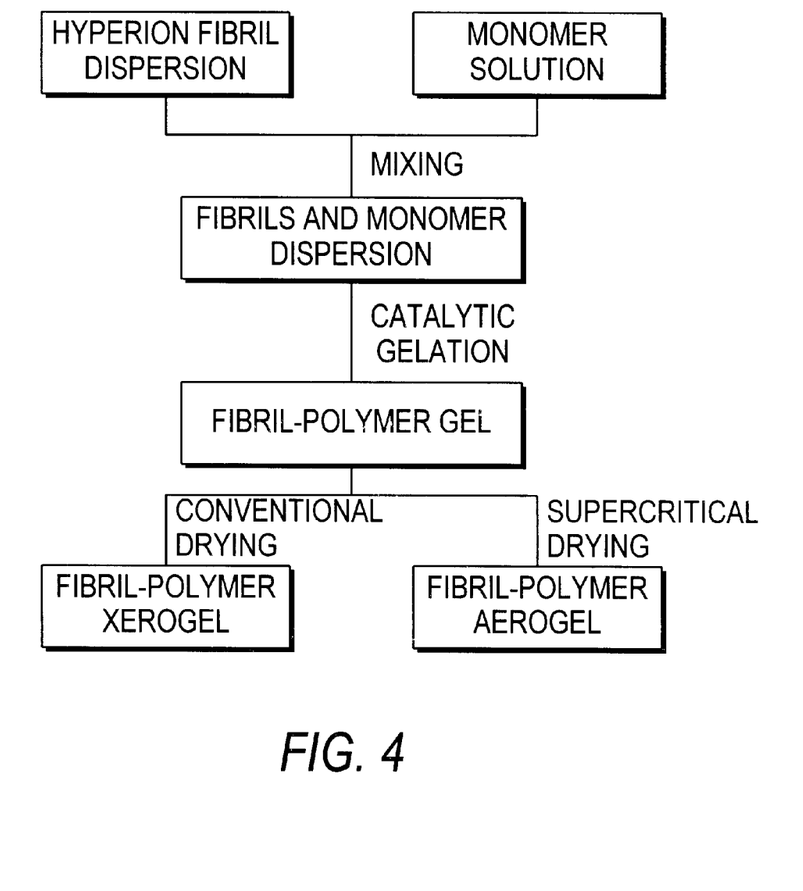
FIG. 4 is a flow diagram of methods of making composite xerogels and aerogels according to one embodiment of the invention.

A general procedure for the preparation of the aerogel composites according to the present invention is schematically illustrated in FIG. 4. Typically, the procedure comprises preparing a nanofiber dispersion (single individual nanofiber dispersion or nanofiber aggregate dispersion) in a suitable solvent; preparing a monomer solution; mixing the nanofiber dispersion with the monomer solution; adding catalyst to the mixture; polymerizing the monomer to obtain a nanofiber-polymer gel composite and drying supercritically to obtain a nanofiber-organic polymer matrix composite. Finally, the nanofiber aerogel composite can be prepared by carbonizing the aerogel composite.

The nanofiber-polymer aerogel composite can also be prepared by drying the gel supercritically. If the gel is dried by conventional method (i.e., not supercritically), a nanofiber-polymer xerogel will be prepared.

Potential applications for the composite aerogels made according to the invention include those applications for conventional aerogels. The improvement of mechanical properties resulted from incorporating nanofibers will make the composite aerogel more attractive and versatile. Moreover, the increasing in conductivity in the composite aerogels will result in new applications.

One embodiment of the invention relates to a rigid supported catalyst for conducting a fluid phase catalytic chemical reaction, processes for performing a catalytic chemical reaction in fluid phase using the supported catalyst and a process for making the supported catalyst.

The supported catalyst of the invention comprises a support comprising a rigid carbon nanofiber structure and a catalytically effective amount of a catalyst supported thereon.

Rigid supported catalysts of the present invention have unique properties. They are exceptionally mesoporous and macroporous and they are pure and they are resistant to attrition, compression and shear and consequently can be separated from a fluid phase reaction medium over a long service life. The increased rigidity of the supports of the present invention enables the structures to be used in fixed bed catalytic reactions. A packing containing the sized rigid structures can be formed and a fluid or gas passed through the packing without significantly altering the shape and porosity of the packing since the rigid structures are hard and resist compression.

Moreover, the uniquely high macroporosity of carbon nanofiber structures, the result of their macroscopic morphology, greatly facilitates the diffusion of reactants and products and the flow of heat into and out of the supported catalyst. This unique porosity results from a random entanglement or intertwining of nanofibers that generates an unusually high internal void volume comprising mainly macropores in a dynamic, rather than static state. Sustained separability from fluid phase and lower losses of catalyst as fines also improves process performance and economics. Other advantages of the nanofiber structures as catalyst supports include high purity, improved catalyst loading capacity and chemical resistance to acids and bases.

Rigid structures formed from nanofiber aggregates are particularly preferred structures for use a catalyst supports. As a catalyst support, carbon nanofiber aggregates provide superior chemical and physical properties in porosity, surface area, separability, purity, catalyst loading capacity, chemical resistance to acids and bases, and attrition resistance. These features make them useful in packed bed or fluid bed processes.

Carbon nanofiber catalyst supports have a high internal void volume that ameliorates the plugging problem encountered in various processes. Moreover, the preponderance of large pores obviates the problems often encountered in diffusion or mass transfer limited reactions. The high porosities ensure significantly increased catalyst life since more catalyst can be loaded onto the support.

The rigid nanofiber catalyst supports of the invention have improved physical strength and resist attrition.

The chemical purity of carbon structures has a positive effect on the selectivity of a supported catalyst since contamination-induced side reactions are minimized. The carbon structures are essentially pure carbon with only small amounts of encapsulated catalytic metal compounds remaining from the process in which the nanofiber was formed. The encapsulated fiber-forming metal compound does not act as a catalyst poison or as a selectivity-affecting contaminant.

The combination of properties offered by nanofiber structures is unique. No known catalyst supports combine such high porosity, high surface area and high attrition resistance. The combination of properties offered by the nanofiber structures is advantageous in any catalyst system amenable to the use of a carbon support. The multiple carbon nanofibers that make up a carbon nanofiber structure provide a large number of junction points at which catalyst particles can bond to multiple nanofibers in the nanofiber structures. This provides a catalyst support that more tenaciously holds the supported catalyst. Further, nanofiber structures permit high catalyst loadings per unit weight of nanofiber and this provides a greater reserve capacity of catalyst. Catalyst loadings are generally greater than 0.01 weight percent and preferably greater than 0.1 weight percent based on the total weight of the supported catalyst. Catalyst loadings greater than 50 weight percent of active catalyst based on the total weight of the supported catalyst are easily within the contemplation of the invention, i.e., loadings in excess of 100 weight percent based on the weight of the support of the invention, owing to the porosity of nanofiber structures and other factors discussed herein. Desirable active catalysts are the platinum group (ruthenium, osmium, rhodium, iridium, palladium and platinum or a mixture thereof) and, preferably, palladium and platinum or a mixture thereof.

Because of their high purity, carbon fibril aggregates have the properties of high purity graphite and, therefore, exhibit high resistance to attack by acids and bases. This characteristic is advantageous since one path to regenerating catalysts is regeneration with an acid or a base. Regeneration processes can be used which employ strong acids or strong bases. Their high purity also allows them to be used in very corrosive environments.

The supported catalysts are made by supporting a catalytically effective amount of a catalyst on the rigid nanofiber structure. The term "on the nanofiber structure" embraces, without limitation, on, in and within the structure and on the nanofibers thereof. The aforesaid terms may be used interchangeably. The catalyst can be incorporated onto the nanofiber or aggregates before the rigid structure is formed, while the right structure is forming (i.e., add to the dispersing medium) or after the structure is formed.

Methods of preparing heterogeneous supported catalysts of the invention include adsorption, incipient wetness impregnation and precipitation. Supported catalysts may be prepared by either incorporating the catalyst onto the aggregate support or by forming it in situ and the catalyst may be either active before it is placed in the aggregate or activated in situ.

The catalyst, such as a coordination complex of a catalytic transition metal, such as palladium, rhodium or platinum, and a ligand, such as a phosphine, can be adsorbed by slurrying the nanofibers in a solution of the catalyst or catalyst precursor for an appropriate time for the desired loading.

These and other methods may be used forming the catalyst supports. A more detailed description of suitable methods for making catalyst supports using nanofiber structures is set forth in. U.S. Pat. No. 5,569,635 by Moy et al. entitled "Catalyst Supports, Methods of Making the Same And Methods of Using the Same", filed Oct. 11, 1994, hereby incorporated by reference. In U.S. Pat. No. 5,569,635, methods of forming catalyst supports with non-rigid nanofiber aggregates are disclosed. These methods of making and using are to suitable for application in making and using catalyst supports using the rigid porous nanofiber structures.

METHODS OF USING SUPPORTED CATALYSTS

Carbon nanofiber structures are candidates for use as catalyst supports for catalysts that heretofore utilized carbon as a support material. These catalysts may catalyze substitution—nucleophilic, electrophilic or free radical; addition—nucleophilic, electrophilic, free radical or simultaneous; β-elimination; rearrangement—nucleophilic, electrophilic or free radical; oxidation; or reduction reactions. The foregoing reactions are defined in March, J. Advanced Organic Chemistry (3rd ed., 1985) at pp. 180–182. See also Grant and Hackh's Chemical Dictionary (5th ed. 1987). More particularly, carbon structures of the invention may be used as catalyst supports for catalysts for slurried liquid phase precious metal hydrogenation or dehydrogenation catalysis, Fischer-Tropsch catalysis, ammonia synthesis catalysis, hydrodesulfurization or hydrodenitrogenation catalysis, the catalytic oxidation of methanol to formaldehyde, and nanofiber- and/or nanofiber aggregate-forming catalysts. Typical heterogeneous catalytic reactions and the catalysts that are candidates for support on rigid porous carbon nanofiber structures are set forth in Table II below.

| Reaction | Catalyst |
|---|---|
| Hydrogenation | |
| Cyclopropane + $H_2$ → $C_3H_8$ | Pt, Pd, Rh, Ru |
| $C_2H_6 + H_2$ → $2CH_4$ | |
| $3H_2 + N_2$ → $2NH_3$ | Fe |
| $2H_2 + CO$ → $CH_3OH$ | $Cu^+/ZnO$ |
| Heptane → toluene + $4H_2$ | Pt |
| Acetone + $H_2$ → 2-propanol | Pt, Copper chromite |
| $H_2$ + aldehyde → alcohol | Pt, Pd, Rh, Ru |
| nitrobenzene → aniline | Pd |
| ammonium nitrate → hydroxylamine | Pd |
| alkene → alkane | Pd, Pt, Rh, Ru |
| substituted alkene → substituted alkane | |
| Dehydrogenation | |
| cyclohexanone → phenol + $H_2$ | Pt |
| Aromatization | |

2a, 3, 4, 4a-tetrahydropyraclone → Pyracene

Pd, Pt, Rh $2HOCH_2CH_2OH$ → 2,3-dihydrodioxin + $H_2$ + $H_2O$

Pt

-continued

| Reaction | Catalyst |
| --- | --- |
| Polymerization | |
| $C_2H_4 \rightarrow$ linear polyethylene | $Cr^{2+}/SiO_2$ |
| Olefin metathesis | |
| $2C_3H_6 \rightarrow C_2H_4 + CH_3CH=CHCH_3$ | $Mo^{4+}/Al_2O_3$ |
| Oxidation | |
| $CH_3OH + \frac{1}{2}O_2 \rightarrow CH_2O + H_2O$ | $Fe_2O_3 \cdot MoO_3$ |
| $H_2O + CO \rightarrow H_2 + CO_2$ | $Fe_3O_4$, Ni, CuO/ZnO |
| $\frac{1}{2}O_2 + CH_2CH_2 \rightarrow CH_3CHO$ | PdCl and similar salts of noble metals |
| $RCH_2OH \rightarrow RCHO + H_2$ | Pt |
| Glucose $\rightarrow$ d-glucuronic acid | Pt |
| Oligomerization | |
| dimethylacetylene dicarboxylate $\rightarrow$ hexamethyl mellitate | Pd |
| Isomerization | |
| [structure: cyclohexene—CH=CH—cyclohexene] ↓ [benzene—CH$_2$CH$_2$—cyclohexane] + [cyclohexane—CH$_2$CH$_3$—cyclohexane] + [benzene—CH$_3$CH$_3$—cyclohexane] | Pd |
| Carbonylation | |
| $CO + CH_3OH \rightarrow CH_3COOH$ | Rh |
| Decarboxylation | |
| [benzene—CH$_2$C(CH$_3$)$_2$CH$_2$CHO] $\longrightarrow$ [benzene—CH$_2$C(CH$_3$)$_2$CH$_3$ + CO] | Pd |
| Hydrosilation | |
| $SiH(CH_3)_3$ + cyclooctadiene-1,3 $\rightarrow$ 3-trimethylsilyl-cyclooctene | Pt |

The process of performing a heterogeneous catalytic chemical reaction in fluid phase with supported catalysts of the invention comprises contacting a reactant with a supported catalyst in fluid phase under suitable reaction conditions. The process may be a batch process or a continuous process, such as a plug flow process or a gradientless process, e.g., a fluidized bed process. The supported catalysts of the invention are particularly useful in catalytic processes where the reaction environment subjects the supported catalyst to mechanical stresses such as those using liquid phase slurry reactors, trickle bed reactors or fluidized bed reactors. The attrition resistance and high loading capability of the supported catalyst are particularly beneficial in these environments.

In a batch process, the reactant(s) are reacted in the presence of the supported catalyst in a reaction vessel, preferably under agitation, and then the supported catalyst is separated from the reactant(s)/product(s) mixture by suitable means for reuse, such as by a filter or a centrifuge.

In a plug flow process, the reactant(s) pass through a stationary bed of supported catalyst, such that the concentration of product(s) increases as the reactant(s) pass through the catalyst bed. Any supported catalyst that becomes entrained in this flow can be separated by suitable means from the reactant(s)/product(s) stream and recycled into the bed.

In a moving bed or fluidized bed process, the supported catalyst is fluidized or entrained with the flow of reactant(s) in the process. The supported catalyst flows concurrently with the reactant(s)/product(s). At the end of the reaction step, any entrained supported catalyst is separated from the unreacted reactant(s)/product(s) stream, such as by filter, centrifuge or cyclone separator, and recycled to the beginning of the reaction step.

In a fluidized bed process, a bed of the supported catalyst is fluidized but remains within the bounds of a fixed zone as the reactant(s) move through the bed and react to form product(s). In this situation any supported catalyst that becomes entrained in the reactant(s)/product(s) stream may be separated by suitable means and returned to the fluidized bed.

In a further form of continuous process, the supported catalyst moves counter-current to the flow of reactant(s). For example, the reactant may be introduced as a gas into the base of a vertical reaction vessel and removed from the top as product(s). The supported catalyst is introduced at the top of the vessel and cascades turbulently downwardly through the upward gas flow to be withdrawn from the bottom for recycle to the top of the vessel. Any supported catalyst entrained in the gas flow exiting the vessel could be separated and recycled to the top of the vessel for recycle into the reaction vessel.

The supports of the invention can also be used as supports for what would otherwise be homogeneous catalysis, a technique sometimes called supported liquid phase catalysis. Their use as supports permits homogeneous catalytic processes to be run using heterogeneous catalysis techniques. In supported liquid phase catalysis, the reactant(s) and catalyst are molecularly dispersed in the liquid phase that is supported within the structure of the nanofiber aggregate.

The high internal volume of nanofiber structures, as evidenced by their porosity, permits them to be loaded with a liquid phase catalyst, much like a sponge, and used as a catalyst, but in a solid particle form. Each catalyst-loaded nanofiber structure can be viewed as a microreactor in that the interior of the structure is loaded with a continuous liquid phase containing catalyst or a plurality of droplets of catalyst in solution. Consequently, the structure behaves both as a solid particle for material handling purposes and as a homogeneous liquid catalyst for reaction purposes. The usefulness of carbon nanofiber structures is aided in this regard by their chemical stability. The advantages in using homogeneous catalyst-loaded nanofiber structures are the ease of separating the catalyst from the product stream, ease in carrying out the process, equipment sizing and in avoiding corrosion in the condensed liquid phase.

Carbon nanofiber structures are amenable to use as supports in the catalysis of substitutions, additions, β-eliminations, rearrangements, oxidations and reductions. More specifically, they are useful in hydroformylation and carboxylation reactions, and the Wacker process.

In carbonylation reactions, a catalyst-loaded carbon nanofiber structure is prepared by absorbing a solution of the carboxylation catalyst, such as rhodium chloride and triphenyl phosphine, in a higher boiling point solvent, such as mesitylene or pseudocumene, into dry carbon nanofiber structures, such as bird nest carbon nanofiber structures.

The carbonylation reaction is carried out by contacting a vapor phase feedstock with the catalyst at appropriate temperatures and pressures. The feedstock mixture may be, e.g., carbon monoxide, methyl acetate, methyl iodide and solvent. The feedstock is absorbed and molecularly dispersed in the catalyst solution and reacts in the liquid phase. The reaction can be carried out in a slurry phase reaction as previously described or in a fixed bed reaction.

The products of reaction, such as acetic anhydride and/or acetic acid and byproducts are removed from the fibril aggregate particles by vaporization or filtration.

In the Wacker Process, a catalyst-loaded carbon nanofiber structure is prepared by absorbing a catalyst, such as palladium chloride, copper chloride, potassium chloride or lithium chloride, in a solvent such as water, into dry carbon nanofiber structures. The loaded catalyst is then placed into a slurry phase or fixed bed reactor and vapor phase reactants, such as ethylene, oxygen and hydrogen chloride, are passed through the bed at appropriate partial pressures and. temperatures. The products, such as acetaldehyde and water can be separated from the catalyst by vaporization or filtration.

EXAMPLES

The invention is further described in the following examples. The examples are illustrative of some of the products and methods of making the same falling within the scope of the present invention. They are, of course, not to be considered in any way limitative of the invention. Numerous changes and modification can be made with respect to the invention.

Example 1 (Comparative)

Preparation of a Nonrigid Porous Fibril Mat

A dilute dispersion of fibrils were used to prepare porous mats or sheets. A suspension of fibrils was prepared containing 0.5% fibrils in water using a Waring Blender. After subsequent dilution to 0.1%, the fibrils were further dispersed with a probe type sonifier. The dispersion was then vacuum filtered to form a mat, which was then oven dried.

The mat had a thickness of about 0.20 mm and a density of about 0.20 gm/cc corresponding to a pore volume fraction of 0.90. The electrical resistivity in the plane of the mat was about 0.02 ohm/cm. The resistivity in the direction perpendicular to the mat was about 1.0 ohm/cm. The mat was flexible, compressible and easily pulled apart.

Example 2 (Comparative)

Preparation of a Nonrigid Porous Fibril Mat

A suspension of fibrils, is prepared containing 0.5% fibrils in ethanol using a Waring Blendor. After subsequent dilution to 0.1%, the fibrils are further dispersed with a probe type sonifier. The ethanol is then allowed to evaporate and a mat is formed. The mat has the same mechanical properties and characteristics as the mat prepared in EXAMPLE 1.

Example 3 (Comparative)

Preparation of a Low-Density Nonrigid Porous Fibril Plug

Supercritical fluid removal from a well dispersed-fibril paste is used to prepare low density shapes. 50 cc of a 0.5% dispersion in n-pentane is charged to a pressure vessel of slightly larger capacity which is equipped with a needle valve to enable slow release of pressure. After the vessel is heated above the critical temperature of pentane (Tc= 196.60°), the needle valve is cracked open slightly to bleed the supercritical pentane over a period of about an hour.

The resultant solid plug of fibrils, which has the shape of the vessel interior, has a density of 0.005 g/cc, corresponding to a pore volume fraction of 0.998. The resistivity is isotropic and about 20 ohm/cm. The resulting structure had poor mechanical properties including low strength and high compressibility.

Example 4

Preparation of a Rigid Structure from Oxidized Nanofibers

A sample was made from oxidized fibrils which were formed into ⅛" extrudates and pyrolized to remove oxygen. The density and porosity (water absorption) was determined to be 0.8 g/cc and 0.75 cc/g, respectively.

Figure 2:
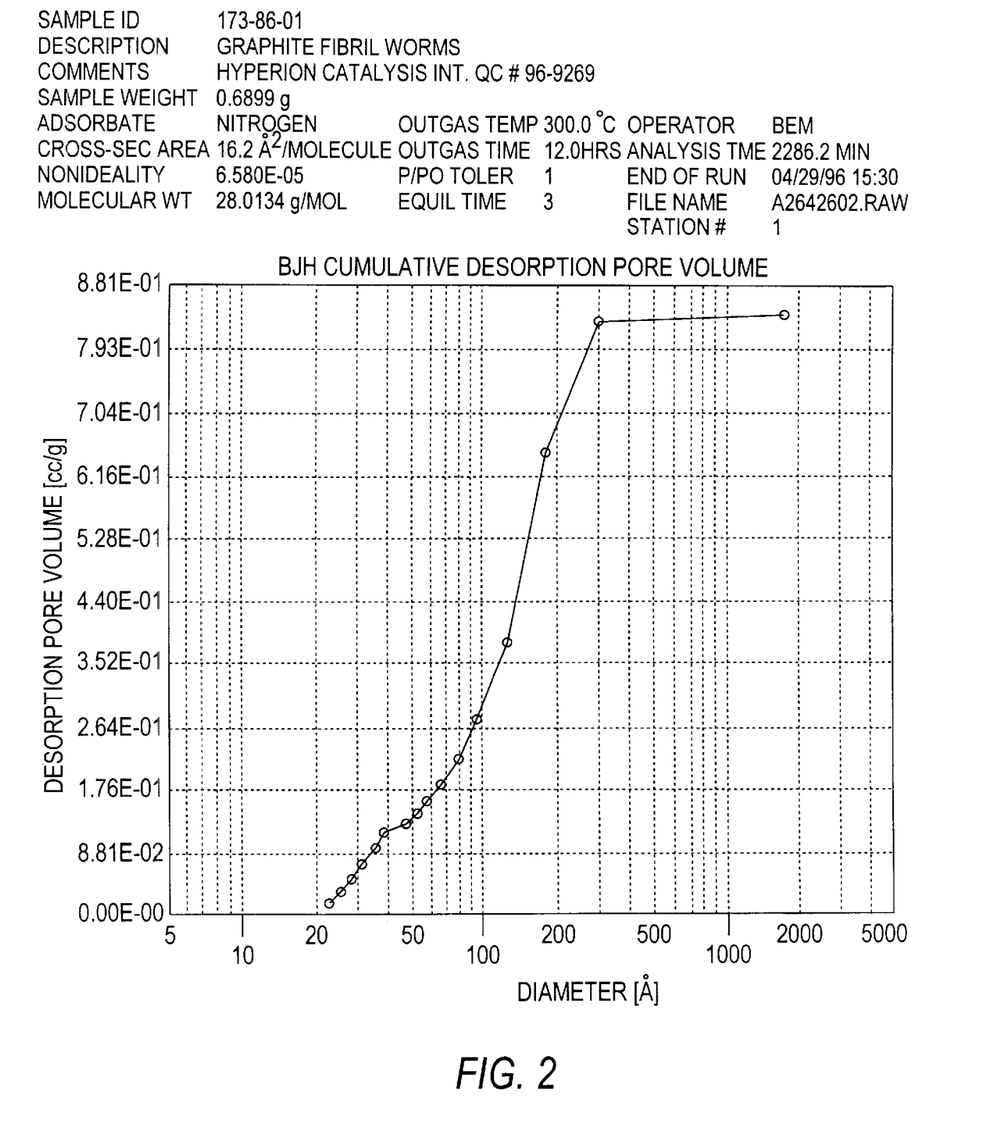
FIG. 2 is a graphical representation of the cumulative pore volume by absorption/desorption for a rigid carbon structure made from oxidized nanofibers wherein the vertical axis represents desorption pore volume and the horizontal axis represents pore diameter.

The sample was analyzed by Quantachrome Corp. for surface area, pore size distribution and crush strength. Quantachrome measured a surface area of 429 $m^2/g$. The total porosity was measured by $N_2$ adsorption/desorption. The value determined was 0.83 cc/g (FIG. 2). FIG. 2 shows a substantial absence of micropores, (i.e., <2 nm). The crush strength for an ⅛ inch extruded was 23 $lb/in^2$.

Example 5

Preparation of a Rigid Structure from "as is" Nanofibers

A sample was made from "as is" nanotube CC aggregates (i.e., not surface oxidized) using phenolic resin/Polyethylene Glycol/Glycerine to hold the aggregates together. The partially dried slurry was pressed and cut into ~¼" pellets, and pyrolized to remove PEG/Glyderine and convert the phenolic resin to carbon. The measured density was 0.63 g/cc; water absorption was 1.0 cc/g.

Figure 3:
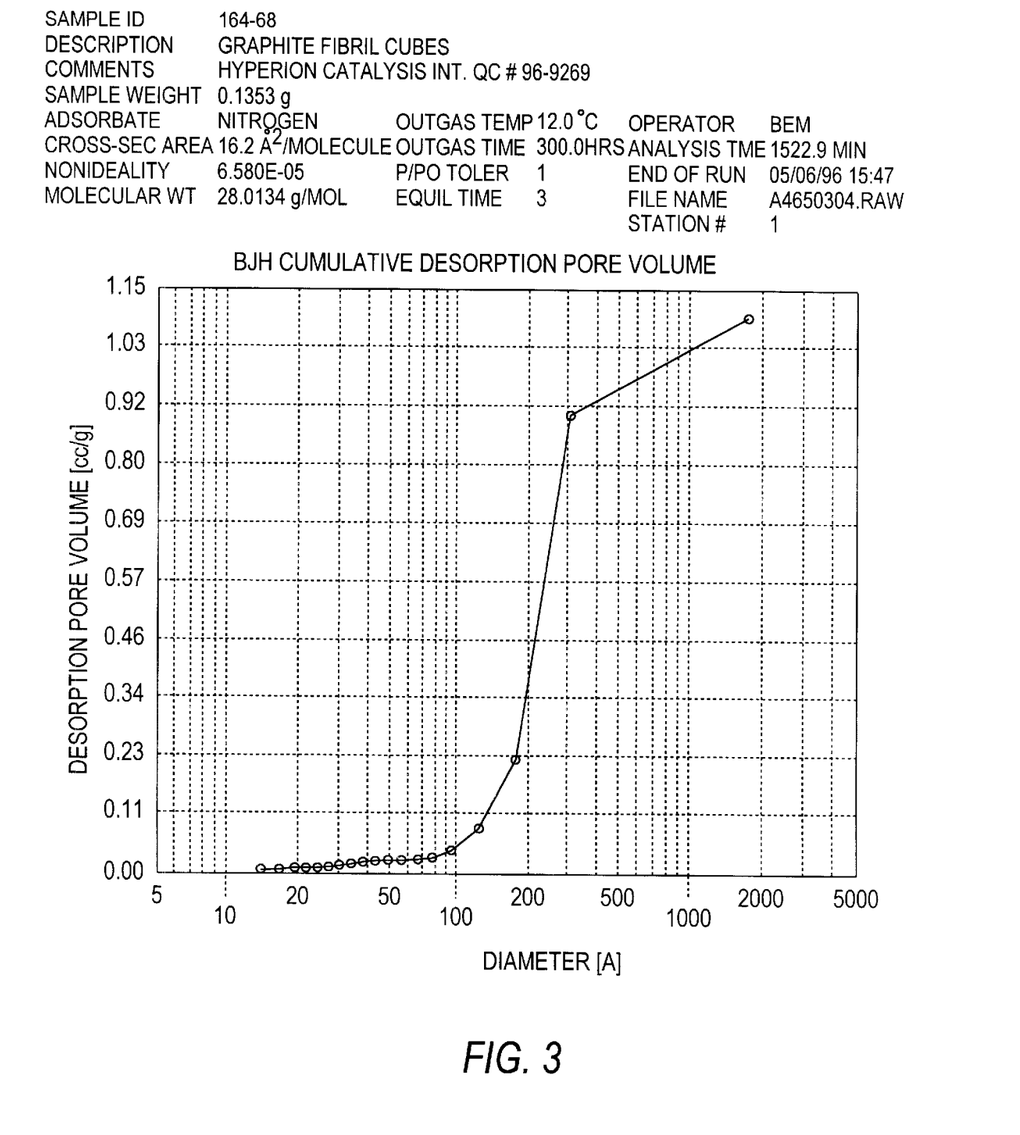
FIG. 3 is a graphical representation of a cumulative pore volume by absorption/desorption for a rigid carbon structure made from "as is" nanofibers wherein the vertical axis represents, desorption pore volume and the horizontal axis represents pore diameter.

The sample was analyzed by Quantachrome Corp. for surface area, pore size distribution and crush strength. The results from Quantachrome indicated a surface area of 351 $m^2/g$. The total pore volume ($N_2$ adsorption/desorption) was 1.1 cc/g (FIG. 3). The pore size distribution showed an absence of micropores (less than 2 nm). The. crush strength from a 1/4 inch diameter pellet was about 70 $lb/in^2$. According to the SEM, this structure is not homogeneous; it consists of a fairly uniform distribution of aggregates with fairly large spacings between aggregates, and smaller spacings between nanotubes in the aggregates.

Example 6

Preparation of a Rigid Structure Using a Gluing Agent

Pellets (¼") of a composite of polyurethane containing 20 wt % BN fibrils was pyrolized at 400–800° C. in flowing argon for 6 hrs to remove all volatiles. Weight loss was 70%.

The resulting hard particles were reduced in volume by ~33% and had a bulk density of ~1.0. The particles were ground in a mortar and pestle without crumbling and sieved to 100–20 mesh. Internal void volume of the articles was measured by absorption of water at r.t. to incipient wetness and found to be 0.9 cc/g. Assuming a true density of 2 g/cc, this corresponds to a void volume of 60%.

Example 7

Preparation of a Rigid Structure Using a Gluing Agent

The procedure in Example 6 was used with a composite of 15 wt % CC fibrils in polystyrene. Weight loss was 74%. Bulk density was 0.62. Water absorption at r.t. was 1.1 cc/g, corresponding to an internal void volume of 69%.

Example 8

Preparation of a Rigid Structure Using a Gluing Agent

A sample of 5.0 g of Hyperion Grade CC Graphite Fibrils™ was slurried for 5 minutes in a Waring Blendor with a cocktail containing 10.0 g polyethylene glycol 600, 4.7 g phenol, 6.5 g of 35% aqueous formaldehyde and 500 cc DI water. A thick, stable suspension was obtained which did not settle after 3 hr. The slurry was transferred to a baffled r.b. flask and the pH was adjusted to 8.5 with ammonium hydroxide and stirred at 65° C. for several hrs.

The slurry was vacuum filtered in a 2" filter to a thick, pasty filter cake (2"×1.5") containing ~7% fibrils. The cake was further vacuum dried at 125° C. to a fibril content of ~15 wt %. At this point the fibril slurry, still containing residual PEG, glycerol, phenol-formaldehyde polymer and water could be formed into extrudates, pellets, or cut into any desired shape. These forms were then vacuum dried further at 180° C.; there was a 10–15% shrinkage in volume, but no cracking or breaking of the forms. The formed pieces were then pyrolized in flowing argon at 650° C. for 4 hrs Final densities were 0.15 g/cc. Internal void volumes were 6.0 cc/g, corresponding to a 93% void volume. The formed pieces were much more rigid than untreated fibril aggregate filter cakes after pyrolysis and could be handled without breaking. The wet particles could also be handled without breaking, and removing water by vacuum drying at 120° C. did not weaken the particles.

Example 9

Preparation of a Rigid Structure Using a Gluing Agent

A sample of 5.0 g Hyperion Grade BN Graphite Fibrils™ was treated as in Example 8. Final density of the formed pieces was 0.30 g/cc; water absorption was 2.8 cc/g, corresponding to a void volume of 86%.

Example 10

Preparation of a Rigid Structure Using a Gluing Agent

A sample of 5.0 g of Grade CC fibrils was treated as in Example 8, except that the mixture also contained 5.0 g glycerin in addition to the other ingredients. Final densities of the formed pieces was 0.50 g/cc. Water absorption was 2.6 cc/g, corresponding to a void volume of 85%.

Example 11

Preparation of Rigid Structure Using a Gluing Agent

A sample of 5.0 g Grade BN fibrils was treated as in Example 10. Final density of the formed pieces was 0.50 g/cc. Water absorption was 1.5 cc/g, corresponding to a void volume of 77%.

Example 12

Preparation of Rigid Structure with Oxidized Nanofibers

A sample of Grade CC fibrils was oxidized with 30% $H_2O_2$ at 60° C. to result in a mixed O-functionality on the fibril surfaces. Carboxylic acid concentrations were determined to be 0.28 meq/g. A sample of 5.0 g of this material in 500 cc DI water was slurried in a Waring Blendor with 0.2 g of Polyethyleneimine Cellulose (from Sigma Chemical) with a base content of 1.1 meq/g. The stable dispersion appeared to be homogeneous and did not settle after several hours.

The dispersion was filtered and dried to a level of ~30% fibril content. The filter cake could be shaped and formed at that point. The formed pieces were dried and pyrolyzed at 650° C. Densities were 0.33 g/cc. Water absorptions were 2.5 cc/g, corresponding to a void volume of 85%.

Example 13

Packed Bed Containing Rigid Porous Structures

A ½" S/S tube was packed to a height of 6" with ⅛" extrudates from Example 10. Using a pressure head of ~10–12" water, water flowed through the bed at ~15–20 cc/min without impediment to flow and without breaking or abrading the particles.

Example 14

Method of Using Rigid Porous Structures in a Fixed-Bed Reactor

A sample of rigid, porous fibril aggregates in the form of ~⅛" extrudates as prepared in Example 10 is used to prepare a Pd on carbon catalyst for use in fixed-bed operation. The extrudates (5.0 g) are washed in DI water and soaked for 1 hr in 6 N $HNO_3$. A solution containing 0.5 g $PdCl_2$ in 6 N HCL is added to the extrudate slurry and the mixture is stirred in a rotary bath for several hours. The extrudate particles are separated by filtration and dried at 150° C. and used in a 0.5" S/S fixed bed reactor to hydrogenate nitrobenzene to aniline.

Example 15

Method of Using Rigid Porous Structures in a S/S Reactor

Extrudates prepared according to Example 11 are used to prepare a molybdenum on carbon catalyst according to the procedure reported by Duchet, et al (ref. Duchet, et al, *J. Catal.* 80 (1983), 386). The catalyst is loaded into a ½" S/S reactor, pre-sulfided at 350° C. in $H_2S/H_2$ and then used to hydrotreat a vacuum oil stream at 350° C. and 0.1 MPa in $H_2$ to remove sulfur prior to subsequent further refining.

Example 16

Pressed Disks from Rigid Porous Structures

Samples of Hyperion Grades BN and CC fibrils were surface functionalized by reaction with 60% nitric acid for 4 hrs at reflux temperature. Carboxylic acid concentrations were 0.8–1.2 meq/g. After removal of excess acid, the treated fibrils were partially dried by vacuum filtration and then fully dried in a vacuum oven at 180° C. at full vacuum. The dried fibril aggregates were very hard; they could not be cut and had to be ground to form into shapes. Samples were pressed into ⅛" thick disks at 10,000 psi in a Carver press using a ½" die. Densities of the uncalcined disks (green) ranged from 1.33 to 1.74 g/cc.

The disks were calcined at 600 and 900° C. to remove surface oxygen. Densities of the. disks were lowered to 0.95 to 1.59 g/cc without weakening the disks.

Example 17

Testing Mechanical Integrity of Rigid Porous Structures

The rigid particles formed in the Examples were tested for brittleness and hardness by dropping them (~¼" particles, either as pellets, extrudates or broken disks) down a 6' tube onto a hard metal surface. The particles were examined closely for breakage or abrasion. The results are shown in Table III, along with a summary of the properties of the materials which were prepared in the examples.

TABLE III

Summary of Physical Properties of Formed Structures

| Example No. | Fibril Type | Density g/cc | Water Absorp. cc/g | Relative Hardness (1) |
|---|---|---|---|---|
| 6 | PU-BN (20%) | 0.7 | 0.9 | N |
| 7 | PS-CC (15%) | 0.6 | 1.1 | N |
| 8 | CC (2) | 0.15 | 6.0 | B,A |
| 9 | BN (2) | 0.30 | 2.8 | N |
| 10 | CC (2) | 0.31 | 2.6 | N |
| 11 | BN (2) | 0.50 | 1.5 | N |
| 12 | CC (3) | 0.55 | 2.5 | N |
| 16 | BN (Green Disc) | 1.74 | — | N |
| 16 | BN (600° C. Disc) | 1.59 | — | N |
| 16 | BN (900° C. Disc) | 1.56 | — | N |
| 16 | CC (Green Disc) | 1.33 | — | N |
| 16 | CC (600° C. Disc) | 1.02 | 0.50 | N |
| 16 | CC (900° C. Disc) | 0.95 | 0.50 | N |
| 20 | | 0.47 | 1.75 | |
| 21 | | 0.45 | 1.70 | |

(1) N—No Breakage or Abrasion; B = Breakage; A = Abraded

Example 18

Activated Fibril-aerogel Composites

The preparation of an aerogel composite comprising carbon fibrils was exemplified by using resorcinol-formaldehyde system.

Materials: Resorcinol (Aldrich, used as received)
Formaldehyde (37% in $H_2O$, Aldrich)
0.2 M $Na_2CO_3$
Oxidized Hyperion CC fibrils (5.8% slurry)

Three samples with different fibril contents (Table IV) were prepared. For every sample, the resorcinol was first dissolved in $H_2O$. After formaldehyde was added, the solution was mixed thoroughly with fibril slurry by ultrasonication.

TABLE IV

Starting composition of the samples

| Sample No. | 1 | 2 | 3 |
|---|---|---|---|
| Resorcinol | 0.333 g | 0.333 g | 0.333 g |
| Formaldehyde | 0.491 | 0.491 | 0.491 |
| Fibril slurry | 1.724 | 3.448 | 8.879 |
| 0.2M $Na_2CO_3$ | 2.6 cc | 5.3 cc | 7.4 cc |
| $H_2O$ | 2.6 | 5.3 | 5.3 |

After the addition of $Na_2CO_3$ catalyst, the mixture was transferred to a glass vial. The sealed vial was placed in an oven at 80° C. to polymerize monomers and subsequently crosslink the polymer. After four days, the samples was removed from the oven. A firm gel with smooth surface was formed for all three samples. The gel was washed with water to remove the catalyst. The water in the gel was exchanged with acetone.

The distribution of fibrils in the polymer matrix was characterized using SEM. The sample for SEM was prepared by drying Sample 3 in air at room temperature. The fibrils were dispersed in the polymer matrix uniformly.

Example 19

Fibril-aerogel Composites 4 g resorcinol was dissolved in 25 cc $H_2O$, then 5.898 g formaldehyde (37% solution) was added to the solution. After adding 0.5 g Hyperion CC fibril to the solution, the mixture was ultrasonicated to highly disperse fibrils in the solution. After adding 0.663 g $Na_2CO_3$ in 5 cc $H_2O$ to the slurry, the slurry was further sonicated to have a uniform mixture. The gelation was carried out following the procedure described in Example 18.

The above description of the invention is intended to be illustrative and not limiting. Various changes or modifications in the embodiments described may occur to those skilled in the art. These can be made without departing from the spirit or scope of the invention.

Example 20

A Bakelite Phenolic Resin, BKUA-2370, available from Georgia-Pacific Resins, Inc., Decatur, Ga., was used as gluing agent for making rigid, porous extrudates from Hyperion Graphite Fibrils™, Grade CC. BKUA-2370 is a heat-reactive phenolic resin dispersed in water/butyl cellosolve at 46 wgt % solids content and is dispersible in water at all dilutions.

A cocktail containing 80.0 g Resin BKUA-2370, 10 g glycerin and 80 g PolyEthylene Glycol, 600 MW dispersed in water (total volume, 500 cc) was prepared. It was thoroughly mixed for minutes in a Red Devil mixer. Five grams of CC Fibrils was treated with 30 cc of the resin cocktail using a Banbury kneader to obtain a thick, uniform paste. Fibril content in the resulting slurry was ~13 wgt %. The slurry was packed into a 50 cc air-driven grease gun, being careful to avoid any air pockets. The grease gun was fitted with a 3 mm nozzle.

The entire slurry was extruded at 40 psi. The extrudate (uncut) was dried at 140° C. for 4 hours in air to remove mainly water and partially cure the resin. The temperature was then slowly increased to 300° C. for 4 hrs to slowly remove any remaining butylcellosolve, PEG and complete the curing of the resin. Finally, the extrudates were broken randomly and calcined in Argon at 650° C. to carbonize the resin. Recovery weight was 5.3 g. Extrudate diameters were ~2–3 mm.

The extrudates as produced were slightly hydrophobic. Water droplets beaded on the particles and only slowly absorbed into the body. However, dilute acid solutions, e.g., 6N $HNO_3$, rapidly asorbed into the particles. After washing the extrudates exhaustively to remove excess acid (pH of effluent >4) and drying at 120° C., the extrudates were penetrated rapidly by pure water.

The water absorption capacity (porosity) was determined by saturating a weighed sample of dry extrudates with water, shaking the extrudate particles to remove any water adhering, and reweighing. The increase in weight in grams represents the amount of water absorbed into the particles in milliliters. These same saturated extrudates were then put into a measured volume of water. The increase in volume was used as the volume of the extrudate bodies, and the densities were calculated from the original dry weights and the increase in volume. The results. gave a density of 0.47 g/cc and a water porosity of 1.75 cc/g.

Example 21

Another Bakelite Resin, BKS-2600, a heat-reactive resin solution (54 wgt %) in ethanol also available from Georgia-Pacific was used to prepare extrudates from Grade BN Fibrils. A cocktail (500 cc) containing 80 g of BKS-2600 and 80 g PEG (600 MW) dissolved in ethanol was prepared. A 25 cc aliqout was used to treat 5.0 g BN fibrils in the same manner as Ex. 20. Fibril content after kneading was ~16%.

The slurry was extruded in the same manner as above and dried at 100° C. for 2 hrs to remove ethanol and any other light volatiles, followed by heating at 140° C. to cure the resin. Temperature was increased slowly as in Ex. 20 to 300° C. to remove volatiles and totally cure the resin. Final calcination was done in Argon at 650° C. Final recovery was 5.2 g.

The extrudates were treated as in Ex. 20 with dilute Lou acid. Water capacity was 1.70 cc/g, density was 0.45 g/cc.

What is claimed is:

1. A supported catalyst for conducting a fluid phase catalytic chemical reaction which comprises:
    (a) a catalyst support comprising a rigid porous carbon structure which comprises intertwined, interconnected, substantially pure carbon nanofibers, said rigid porous carbon structure having a density greater than 0.8 g/cm$^3$ and a crush strength greater than 5 lb/in$^2$; and
    (b) a catalytically effective amount of a catalyst supported on said catalyst support.

2. The supported catalyst of claim 1, wherein said rigid porous carbon structure has a surface area greater than about 100 m$^2$/gm, being substantially free of micropores and having a crush strength greater than about 5 psi.

3. The supported catalyst of claim 1, wherein said rigid porous carbon structure comprises less than 5% of pore volume attributed to micropores.

4. The supported catalyst of claim 1, wherein said rigid porous carbon structure comprises less than 1% of pore volume attributed to micropores.

5. The supported catalyst of claim 1, wherein said rigid porous carbon structure has a density of grater than 0.2 g/cm$^3$.

6. The supported catalyst of claim 1, wherein said rigid porous carbon structure has a density of greater than 0.5 g/cm$^3$.

7. The supported catalyst structure of claim 1, wherein carbon nanofibers are uniformly and evenly distributed throughout said rigid porous carbon structure.

8. The supported catalyst of claim 1, wherein said rigid porous carbon structure comprises aggregate spacings between the interconnected aggregate particles and nanofiber spacings between said nanofibers within said aggregate particles.

9. The supported catalyst of claim 1, wherein said catalyst is a metal selected from the group consisting of Group IB, Group IIB, Group VI, Group VII, Group VIII, the lanthanides, salts thereof and mixtures thereof.

10. The supported catalyst of claim 1, wherein said catalyst is selected from the group consisting of ruthenium, osmium, rhodium, iridium, palladium, platinum, gold, rhenium, salts thereof and mixtures thereof.

11. The supported catalyst of claim 1, wherein catalyst loadings are greater than 0.01 weight percent based on the total weight of said supported catalyst.

12. The supported catalyst of claim 1, wherein said rigid porous carbon structure is formed into a shape selected from extrudates or pellets.

13. A method of making a supported catalyst for conducting a fluid phase catalytic chemical reaction comprising incorporating a catalytically effective amount of a catalyst onto a catalyst support which comprises a rigid porous carbon structure, comprising intertwined, interconnected, substantially pure carbon nanofibers and having a density greater than 0.8 g/cm$^3$ and a crush strength greater than 5 lb/in$^2$.

14. The method of claim 13, wherein said catalyst is incorporated onto said catalyst support by deposition, adsorption, incipient wetness, impregnation, precipitation or coprecipitation.

15. The method of claim 13, wherein said incorporating onto said rigid porous structure is accomplished in a single step or in multiple sequential steps.

16. The method of claim 13, wherein the surface of said rigid porous carbon structure is oxidized.

17. The method of claim 13, wherein said rigid porous carbon structure is prepared by a method comprising
    (a) dispersing a plurality of nanofibers in a medium to form a suspension;
    (b) separating said medium from said suspension to form said structure; wherein said nanofibers are interconnected to form said rigid structure of intertwined nanotubes bonded at the nanotube intersections within the structure.

18. The method as recited in claim 17, wherein said nanofibers are uniformly and evenly distributed throughout said structure.

19. The method as recited in claim 17, wherein said carbon nanofibers are in the form of aggregate particles interconnected to form said structure.

20. The method as recited in claim 19, wherein said aggregate particles are evenly dispersed within said medium to form a slurry and said aggregate particles are connected together with a gluing agent to form said structure.

21. The method as recited in claim 17, wherein said medium is selected from the group consisting of water and organic solvents.

22. The method as recited in claim 17, wherein said medium comprises a dispersant selected from the group consisting of alcohols, glycerin, surfactants, polyethylene glycol, polyethylene imines and polypropylene glycol.

23. The method of claim 17, wherein said carbon nanofibers are surface oxidized nanofibers that have been oxidized prior to dispersing in said medium and said surface oxidized nanofibers are self-adhering, forming said rigid structure by binding at the nanofiber intersections.

24. The method of claim 17, wherein said rigid porous structure is subsequently pyrolyzed to remove oxygen.

25. The method as recited in claim 17, wherein said nanofibers are dispersed in said suspension with gluing agents and said gluing agents bond said nanofibers to form said rigid structure.

26. The method as recited in claim 25, wherein said gluing agent comprises carbon.

27. The method as recited in claim 25, wherein said gluing agents are selected from the group consisting of cellulose, carbohydrates, polyethylene, polystyrene, nylon, polyurethane, polyester, polyamides and phenolic resins.

28. The method as recited in claim 25, wherein said structure is subsequently pyrolized to convert the gluing agent to carbon.

29. The method as recited in claim 17, wherein said step of separating comprises filtering said suspension.

30. The method as recited in claim 17, wherein said step of separating comprises evaporating said medium from said suspension.

31. The method of claim 13, wherein said rigid porous structure is made by a method comprising;
    (a) dispersing a plurality of carbon nanofibers in a medium to form a suspension;
    (b) using a kneader to obtain a uniform, thick paste of the nanofiber suspension;
    (c) extruding or pelletizing the paste;
    (d) separating said medium from said suspension to form said structure, wherein said nanofibers are intertwined to form said rigid structure of intertwined nanotubes bonded at the nanotube intersections within the structure.

32. The method of claim 13, wherein said catalyst is formed by a process comprising:
    (a) forming an aqueous solution of a compound selected from the group consisting of a refractory metal oxide, a metal and a metal containing precursor compound and an aluminum and/or magnesium compound;
    (b) coprecipitating said compound onto said catalyst support; and
    (c) calcining the structure of step (b) to form said supported catalyst.

33. The method of claim 32, wherein said calcining is conducted at a temperature from about 150° C. to about 800° C.

34. A method of making a supported catalyst for conducting a hydrogenation reaction, a dehydrogenation reaction, Fischer-Tropsch reaction, an ammonia synthesis, an isomerization reaction, a hydrodesulfurization reaction, a carbonylation reaction, a Wacker process, a discrete fibril-forming reaction or a fibril aggregate-forming reaction, comprising incorporating a catalytically effective amount of a catalyst onto a catalyst support which comprises a rigid porous carbon structure, comprising intertwined, interconnected, substantially pure carbon nanofibers and having a density greater than 0.8 g/cm$^3$ and a crush strength greater than 5 lb/in$^2$.

35. A method of making a supported catalyst for conducting a substitution reaction, an addition reaction, a β-elimination reaction, a rearrangement reaction, an oxidation reaction, a reduction reaction, two or more of the foregoing reactions, comprising incorporating a catalytically effective amount of a catalyst onto a catalyst support which comprises a rigid porous carbon structure, comprising intertwined, interconnected, substantially pure carbon nanofibers and having a density greater than 0.8 g/cm$^3$ and a crush strength greater than 5 lb/in$^2$.

36. A supported catalyst for conducting a substitution reaction, an addition reaction, a β-elimination reaction, a rearrangement reaction, an oxidation reaction, a reduction reaction, two or more of the foregoing reactions, comprising:
    (a) a catalyst support comprising a rigid porous carbon structure which comprises intertwined, interconnected, substantially pure carbon nanofibers, said rigid porous carbon structure having a density greater than 0.8 g/cm$^3$ and a crush strength greater than 5 lb/in$^2$; and
    (b) a catalytically effective amount of a catalyst supported on said catalyst support.

37. A supported catalyst for conducting a hydrogenation reaction, a dehydrogenation reaction, Fischer-Tropsch reaction, an ammonia synthesis, an isomerization reaction, a hydrodesulfurization reaction, a carbonylation reaction, a Wacker process, a discrete fibril-forming reaction or a fibril aggregate forming reaction, comprising:
    (a) a catalyst support comprising a rigid porous carbon structure which comprises intertwined, interconnected, substantially pure carbon nanofibers, said rigid porous carbon structure having a density greater than 0.8 g/cm$^3$ and a crush strength greater than 5 lb/in$^2$; and
    (b) a catalytically effective amount of a catalyst supported on said catalyst support.

38. A method of making a supported catalyst with a rigid porous carbon structure having a crush strength greater than 5 lb/in$^2$, comprising:
    (a) forming a first slurry of alumina and/or magnesia particles and carbon fibril aggregates, wherein said fibril aggregates are interconnected to form a rigid porous carbon structure of fibril aggregates bonded at the fibril aggregate intersections within the structure and have a crush strength greater than 5 lb/in$^2$;
    (b) mixing said slurry of step (a) with a solution of salts of a catalytically effective amount of a catalyst for a fluid phase catalytic reaction thereby causing a precipitate to form which incorporates said catalyst onto said alumina and/or magnesia particles; and
    (c) calcining said second slurry to form said supported catalyst.

39. The method of claim 38, wherein said calcining is conducted at a temperature from about 150° C. to about 800° C.

* * * * *